Sept. 3, 1946.                H. P. DONLE                 2,407,065
                              RAY PROJECTOR
                          Filed April 16, 1942
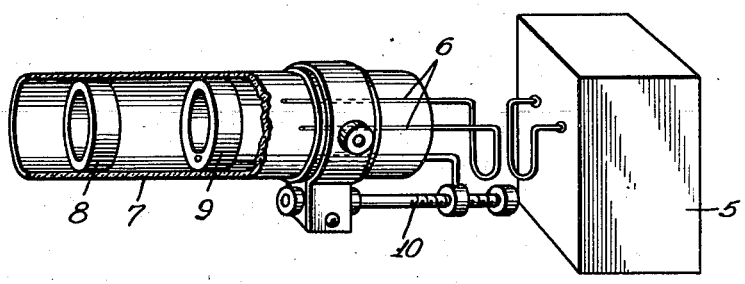
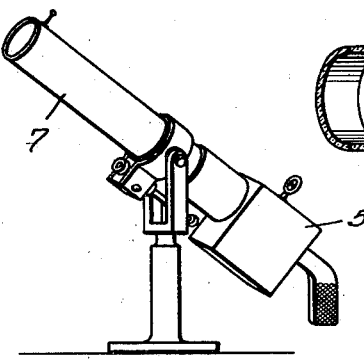
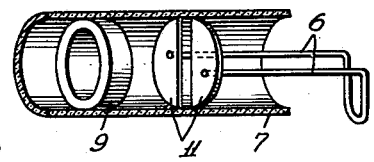
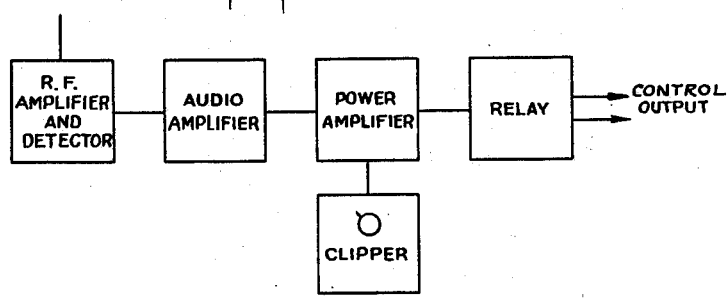
INVENTOR
*Harold P. Donle*
BY
*Mitchell Bechert*
ATTORNEYS.

Patented Sept. 3, 1946

2,407,065

UNITED STATES PATENT OFFICE 2,407,065

RAY PROJECTOR

Harold Potter Donle, New York, N. Y.; Miriam D. Jensen, administratrix of said Harold Potter Donle, deceased, assignor of one-half to Daniel J. McCarthy Application April 16, 1942, Serial No. 439,163

10 Claims. (Cl. 250—11)

My invention relates to ray projecting means, and especially to the projection of wave energy within the frequency limits of the electromagnetic spectrum.

It is an object of the invention to provide means for determining with great accuracy the location of an object at relatively great distances and which may be invisible.

It is another object to provide very simple means for accurately determining the position of an object at a distance.

Another object is to provide an improved ray projector for projecting rays in a definite direction and confining the ray within narrow limits.

Another object is to provide an improved ray projector, so arranged that a beam may be projected and varied as to its extent or focused so as to cover variable fields at a point removed from the projector and, in general, it is an object to provide an improved ray projecting means.

Other and more specific objects will be hereinafter pointed out or will become apparent to those skilled in the art.

In the drawing which shows, for illustrative purposes only, a preferred form of the invention—

Fig. 1 is a more or less schematic or diagrammatic view of various elements of my improved projector;

Fig. 1a is a view of a modified detail;

Fig. 2 is a view of parts shown in Fig. 1, all mounted for scanning movement;

Fig. 3 is a diagrammatic view of receiving means for reflected waves.

Generally speaking, my improved device in more or less complete form includes means for generating relatively high frequency radio waves, together with means for directing a relatively narrow beam of waves in any desired direction. Preferably, I employ what may be termed "focusing means" for confining the beam to the desired limits of extent and the focusing means will preferably be of a variable nature so that the beam may be made to diverge or converge as desired. Such focusing means include a focusing tube and one or more focusing members, later to be described.

The character of the radio waves generated is such that they will have many of the characteristics of light. When the frequency is sufficiently high, say, of the order of 800 megacycles, the waves will definitely be reflective in character in much the same manner that light is reflective. Hence the invention contemplates the use of waves of very short length, for example, those known in the art as "quasi-optical" waves; and the reference in the claims to "ultra-high-frequency" is intended to include such waves. Therefore, radio waves projected from my improved projector may be caused to strike an object at a distance and some of the energy of the waves will be reflected back toward the projector. I provide detector or receiver means at a convenient location to pick up the reflected energy and thus to give an indication that an object has been struck by the beam from the projector.

Since high frequency radio waves have many of the characteristics of light, it is possible to use the well known "lens" effect of small apertures on light. I preferably cause the waves from the generator to pass through one or more apertures so as to in effect focus the rays and secure a beam having the desired characteristics; that is to say, the beam may be focussed in such a way as to be considerably divergent and cover a relatively large target, and, one the other hand, the focusing arrangement may be such as to cause the beam to be a practically parallel beam or pencil covering a very small target.

In the preferred form illustrated, I have shown a wave generator in the form of an oscillator 5, which may be of any suitable type, capable of producing steady oscillations of the desired frequency. The wave radiating or propagation means 6 which propagates waves into the focusing tube may consist of one or more rods connected either directly or inductively to the oscillator, and preferably so positioned or arranged that a reasonably narrow beam of radiation is projected in the generally desired direction. The radiator rod or rods will preferably be mounted within a focusing tube 7 and preferably parallel with the axis of the tube. The principal function of the focusing tube is to decrease the side radiation of energy from the radiator 6 by causing the energy to be reflected by the inner wall of the tube, with the result that radio waves will be projected from the end of the tube in the form of a relatively narrow beam. When a tube 7 of relatively large proportions is employed, I preferably employ one or more focusing means or members 8—9. These focusing members may be in the form of disks or cups mounted within the bore of the focusing tube and may be provided with apertures therein, which may be round or angular, depending upon the characteristics of the beam desired. The length of these apertures is, as illustrated, preferably less than the length of the focusing tube. The locations of the focusing members 8—9 along the tube and relatively to each other will preferably be variable, and means such as the screw traverse means 10 should be provided for rapid and critical adjustment of one or all of the focusing members. The particular location or locations of the focusing member or members will ordinarily depend upon several factors, including the frequency of the waves, distance to the target, and the amount of beam constriction or divergence desired, and the effect of the focusing members will depend more or less upon their phase relations with the radiator.

Since the apertured focusing members lie in the path of the relatively strong radiation from the radiator, they absorb some of the energy, and proper phase relations between these focusing members and the radiator or propagation means may cause an increase or a decrease of the radiated energy. The focusing tube 7, may be of conducting or metallic material or of semi-conducting or non-metallic material, or of non-conducting or insulating material. The most suitable material so far tried is glass, and this is the material represented in Figs. 1 and 1a, by way of example. The characteristics of glass in this connection are entirely different from those of metal, due principally to three factors: first, it is a dielectric material; second, with metal much of the energy will be absorbed by the metal; and, third, if the tube is sufficiently long, it will in itself oscillate and radiate energy at right angles to the axis of the tube. With glass there is practically no absorption and the dielectric constant is relatively high. The tube itself cannot oscillate and there is a strong reflective action from the side walls of a glass tube which greatly aids in the proper focusing action. There are also reflection (and refraction) effects from the focusing members as well as from the focusing tube. Thus the focusing tube and the focusing member or members preferably should be of material having considerably different wave-energy absorption and reflection characteristics.

In the projector above described the focusing tube is of generally cylindrical form and the focusing members have circular apertures. In some cases, however, it will be desirable to use other forms of apertures, instead of circular ones having various rectangular or other configurations, even a thin slit. By the use of such a slit or slits, suitably positioned, the vertical or horizontal components, or both, of the radiated wave may be focused separately. When the aperture of a focusing member is of angular form (as distinguished from circular) the focusing tube may be angular and of the same general configuration or proportions as the aperture.

Under certain conditions it has been found to be advisable to modify the radiator 6 somewhat as by connecting armatures or plates thereto. Such plates 11 may be of various shapes, e. g., segment-shaped as shown in Fig. 1a. One effect of these plates is to increase the end radiation, that is, the radiation along the axis of the tube and to decrease the side or non-useful radiation. The effect of the plates 11 upon the operation of the radiator is effectively to concentrate the radiation potential or current at the ends of the rods 6. Therefore, the radiation from the sides of the rods will be reduced to a low value and the wave-energy propagation from the ends will be increased proportionately, as well as changed in its electrostatic and electromagnetic configuration within the focusing tube. Should but one radiating rod be employed only one plate 11 need be used.

The improved projector, as has been indicated, is principally useful for projecting a very narrow or angularly restricted beam; in other words, a beam which will cover a relatively small target and will therefore indicate with a high degree of fidelity the position of any object forming a target area for the beam. Thus, my improved projector may be employed (in connection with a detector or receiver) in detecting the exact position of an airplane, a ship at sea, a mountain, or any other object which would form a target area for the projected beam, and my improved projector has the advantage of being usable regardless of conditions of darkness or light and whether the weather be clear or foggy. When an area representing a relatively small target area, say an airplane in the sky, is struck by the projected beam, some of the energy will be reflected by the target area back in the direction of the transmitter. I therefore provide a receiver located preferably close to the transmitter.

One form of receiving means is shown and described diagrammatically in Fig. 3. If the transmitted energy is modulated at some relatively low frequency, a simple receiver may be employed. Such a receiver may consist of any suitable type of radio amplifier and detector together with an audio amplifier proper for the frequency of modulation employed. Such receiver preferably has connected to its output a power amplifier and a relay, as shown in Fig. 3. The relay may operate, say, a signalling device when energy is being received. The receiver also preferably has a sensitivity control connected at a suitable point in its circuit which will allow incoming signals to be reduced to zero. It will also be found convenient to have connected to the output of the receiver a sensitive D. C. meter (such as one having a maximum range of one milliampere) connected in series with a rectifier and a variable resistance, this latter for the purpose of varying sensitivity of the meter. It is also desirable to have a variable grid bias on the last audio or power amplifier tube of sufficiently high value to allow the grid to be biased considerably beyond "cut off." This adjustable cut-off device is represented in Fig. 3 as "Clipper." Since the emitted wave energy from the transmitter or projector comes to a relatively sharp point, as the projector is moved in a sort of scanning way the biasing adjustment may be used to "clip" this relatively sharp point at any desired value as is usual in the art of transmission and reception of accurately defined time-period pulses so that, for example, one degree of scanning movement of the projector may be the range of relay operation but by readjustment it might be readily increased to ten degrees. It is, of course, obvious that the control could be made automatic by using any of the well-known methods.

There are numerous other uses of the invention. For example, my improved projector may be mounted on an airplane and the described relay connected to operate or to permit the operation of the triggers of one or more automatic rifles. There should, of course, be an "on" and "off" switch beside the pilot or gunner. The result of such an arrangement is that the relay will respond only when the airplane is pointed at an enemy plane ahead of it; that is to say, when the automatic rifles are pointed directly at the target. Such an arrangement will effect a tremendous saving in ammunition, since the automatic rifles can never fire except when correctly aimed at the target.

Another important use of my invention is in the detection of the presence on the sea of a submarine on the surface, an iceberg, or a ship, for example; in other words, any object on the surface of the water. My improved projector can be mounted to oscillate or scan continuously throughout an arc of, say, 45 degrees, and any object on the surface of the water within that range can be made to cause the sounding of an alarm.

All of the arrangements above referred to will, of course, operate in daylight, darkness, or fog with equal facility.

My improved device can also be used as a means of directional communication where it is desirable to aim the transmitter at a selected receiver, thereby minimizing or eliminating the possibility of interception of a message by other receivers not in line with the focused rays or beam.

Clearly, my improved invention would be a great aid in blind flying, in that objects such as mountains would be readily detected by the pilot of the aircraft.

While the invention has been described in considerable detail and a preferred form illustrated, it is to be understood that various changes may be made within the scope of the invention as defined in the appended claims.

I claim:

1. A ray projector including, generating means for generating ultra-high-frequency radio waves, a focusing tube of non-conducting material through which generated waves may pass, wave propagation means located near one end of said tube for propagating waves within said tube, connections coupling said generating means to said propagation means, and means for angularly restricting the wave energy projected from said focusing tube comprising said focusing tube, and a focusing member within said tube, said member being of material of considerably different conductivity from that of said tube and having an aperture therein through which said waves may pass.

2. A ray projector including, generating means for generating ultra-high-frequency radio waves, a focusing tube of non-conducting material through which generated waves may pass, propagation means located near one end of said tube for propagating waves within said tube, connections coupling said generating means to said propagation means, and means for angularly restricting the wave energy projected from said focusing tube comprising said focusing tube and a focusing member adjustable longitudinally within said tube, said member being of material of considerably different conductivity from that of said tube and having an aperture therein through which said waves may pass.

3. A ray projector including, a generator of ultra-high-frequency radio waves, a glass focusing tube of fixed length through which said waves may pass, wave propagation means located within one end of said tube, connections coupling said generator to said propagation means, and a focusing member within said tube, said member being of material having considerably different wave energy absorption and reflection characteristics from those of said tube and having a focusing aperture therein through which substantially all of the projected waves pass, whereby the wave energy projected from said focusing tube may be angularly restricted.

4. A ray projector according to claim 3 of which said focusing member is adjustable longitudinally of said tube and said focusing aperture is of the same configuration as the inside of said tube.

5. In an ultra-high-frequency ray projector, the combination which comprises, a focusing tube, wave propagation means located near one end thereof for propagating ultra-high-frequency waves into said tube, two focusing members supported within said tube, and a focusing aperture in each said member through which may pass waves to be projected from said tube, said apertures being proportioned respectively one to pass more of the vertical than of the horizontal components and the other to pass more of the horizontal than of the vertical components of said waves, the material of said tube having different wave-energy absorption and reflection characteristics from those of said focusing members, and adjustable means associated with at least one of said apertures by which the vertical and horizontal components of said waves may be separately focused, whereby the wave energy projected from said focusing tube may be angularly restricted.

6. In an ultra-high-frequency ray projector, the combination which comprises, a focusing tube of insulating material, of uniform diameter and of fixed length and having two ends, wave propagation means positioned near one end of said tube for propagating radio waves therein, the other end of said tube being open for projection therefrom of a focused beam of ultra-high-frequency waves, and a focusing member having different wave energy absorption and reflection characteristics from those of said tube and supported by and within said tube and having a focusing aperture therein through which substantially all of said projected waves pass, the length of said aperture being less than the length of said tube, whereby the wave energy projected from said focusing tube may be angularly restricted.

7. In the combination according to claim 6, a second focusing member having different wave energy absorption and reflection characteristics from those of said tube, supported by and within said tube and having a focusing aperture therein through which substantially all of said projected waves pass, at least one of said focusing members being adjustable longitudinally of said tube for adjusting the degree of focusing of said projected beam.

8. In an ultra-high-frequency ray projector, the combination which comprises, a focusing tube having two ends, wave propagation means for propagating ultra-high-frequency waves into one end of said tube, at least one focusing member supported within said tube, and a focusing aperture in each said member through which pass substantially all of the waves projected from the other end of said tube, the material of said focusing members and the material of said tube having different wave-energy absorption and reflection characteristics, whereby the wave energy projected from said focusing tube may be angularly restricted.

9. In an ultra-high-frequency ray projector, the combination which comprises, a focusing tube of semi-conducting material, wave propagation means positioned near one end thereof for propagating ultra-high-frequency waves into said tube, a focusing member supported within said tube, and a focusing aperture in said member through which may pass waves to be projected from said tube, said focusing member being of material having different wave energy absorption and reflection characteristics from those of said tube, whereby the wave energy projected from said focusing tube may be angularly restricted.

10. A ray projector including, generating means for generating ultra-high-frequency radio waves, a focusing tube of non-conducting material through which generated waves may pass, wave propagation means located near one end of said tube for propagating waves within said tube, connections coupling said generating means to said propagation means, and a focusing member within said tube, said member being of material of considerably different dielectric constant from that of said tube and having an aperture therein through which said waves may pass, whereby the wave energy projected from said focusing tube may be angularly restricted.

HAROLD POTTER DONLE.